United States Patent [19]
Catanzaro et al.

[11] Patent Number: 5,502,727
[45] Date of Patent: Mar. 26, 1996

[54] IMAGE AND AUDIO COMMUNICATION SYSTEM HAVING GRAPHICAL ANNOTATION CAPABILITY

[75] Inventors: Anthony J. Catanzaro, Jackson; Steven C. Dzik, Somerset; Charles Hull, Wall; Mahendra Pratap, Cliffwood Beach; Jerome Prestinario, Bridgewater; Minakanagurki V. Ranganath, Lincroft; John F. Ribera, Howell, all of N.J.

[73] Assignee: AT&T Corp., Murray Hill, N.J.

[21] Appl. No.: 49,727

[22] Filed: Apr. 20, 1993

[51] Int. Cl.⁶ ................................................. H04M 11/00
[52] U.S. Cl. .................. 370/94.2; 370/110.1; 370/84; 379/93; 348/14; 348/552
[58] Field of Search .................... 370/94.1, 94.2, 370/110.1, 62, 84; 379/53, 96, 98, 90, 93, 110; 348/14, 15, 16, 552, 462

[56] References Cited

U.S. PATENT DOCUMENTS

| | | | |
|---|---|---|---|
| 4,994,912 | 2/1991 | Lumelsky et al. | 348/552 |
| 5,150,357 | 9/1992 | Hopner et al. | 370/110.1 |
| 5,300,943 | 4/1994 | Jakobs et al. | 345/173 |
| 5,309,434 | 5/1994 | Maekawa | 379/96 |
| 5,347,305 | 9/1994 | Bush et al. | 348/14 |
| 5,351,276 | 9/1994 | Doll, Jr. et al. | 370/94.2 |

FOREIGN PATENT DOCUMENTS 390170  10/1990  European Pat. Off. .

OTHER PUBLICATIONS

"Concept's Image 30" TeleConference, Jul. 1988.

*Primary Examiner*—Douglas W. Olms
*Assistant Examiner*—Min Jung
*Attorney, Agent, or Firm*—John A. Caccuro

[57] ABSTRACT

A telephone apparatus enables the approximate simultaneous transmission and reception of audio interleaved with image and graphical annotation signals, in data packet form, over an analog line which connects the apparatus to a switched telephone network. The audio data packets are transmitted at a periodic rate, during a first time interval, and the image and annotation data packets are transmitted during a second time interval, following the first time interval, enabling the simultaneous output of voice, image and annotation data at the receiver site. Control data packets, as needed, are also transmitted during the second time interval for end-to-end apparatus control. One feature enables the transmission of audio data packets at a first periodic rate, when in an image transmission mode, and at a second periodic rate, faster than the first periodic rate, when not in the image transmission mode.

38 Claims, 11 Drawing Sheets

FIG. 7

AUDIO TRANSMISSION MESSAGES

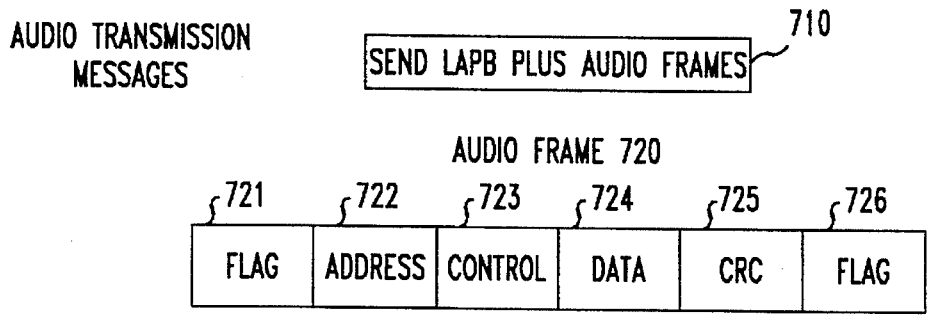

721 FLAG IDENTIFIES FRAME BOUNDARIES

722 ADDRESS FIELD IDENTIFIES AUDIO FRAMES

723 CONTROL FIELD PROVIDES FLOW CONTROL AND DEFINES INFORMATION TYPE (DATA/CONTROL)

725 CYCLIC REDUNDANCY CHECK FOR ERROR CONTROL, FRAME OF AUDIO IS DISCARDED IF IN ERROR

724 DATA FIELD
    WITH IMAGE TRANSMISSION = 85 BYTES/100 msec
    NO IMAGE TRANSMISSION = 34 BYTES/40 msec

FIG. 8

IMAGE, ANNOTATION, SUPERVISORY MESSAGES, PACKET STRUCTURE 810

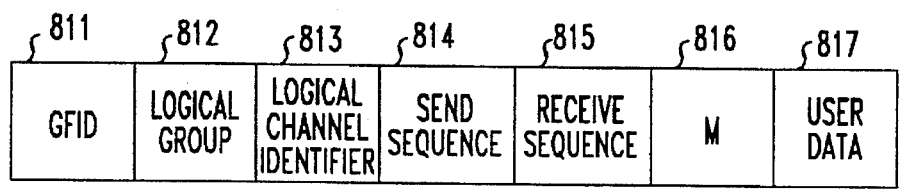

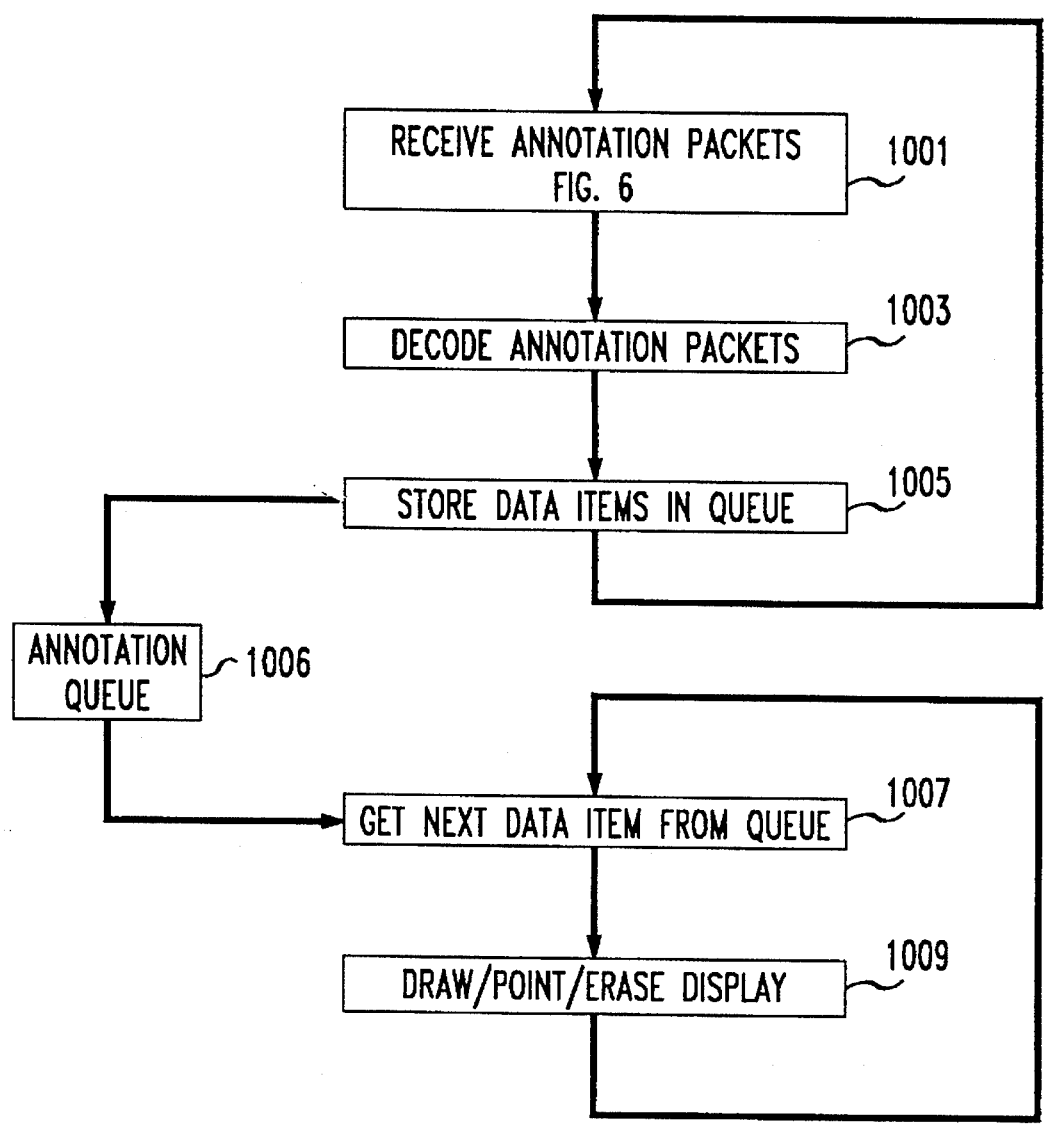

IMAGE AND AUDIO COMMUNICATION SYSTEM HAVING GRAPHICAL ANNOTATION CAPABILITY

FIELD OF THE INVENTION

This invention relates to image data transmission and, more particularly, to the transmission of audio and graphical annotation data along with the image data.

BACKGROUND OF THE INVENTION

Multi-media is an emerging technology that promises the delivery of combined audio, video, still images, graphics, text and annotation between users. Today there exists a variety of still image communication terminals which can be used over an analog tip/ring telephone line. One such product is the AT&T VideoPhone 2500 which provides simultaneous real time, color video and voice communications over an analog line. Another product, the Sony PVT-115 provides voice and image transmission which is not simultaneous and which does not have graphical annotation capability. Yet another product, the Photophone from Image Data Corporation has graphical annotation capability but image and voice cannot be sent simultaneously and also requires an external telephone interface. The Comtech Lab's Vone has simultaneous voice and still image capability but does not provide a graphical annotation capability. Thus, there is a continuing need for terminal apparatus to provide "simultaneous" voice, image and graphical annotation transmission over an analog telephone line.

SUMMARY OF THE INVENTION

In accordance with the present invention, a telephone apparatus acquires image, audio and graphical annotation signals which are each encoded as a separate logical channel in data packets for simultaneous transmission over an analog line connected between the apparatus and a switched telephone network. According to one aspect of the invention, a first means encodes the acquired audio signal into a group of audio data packets which are periodically transmitted over the analog line, during a first time interval. The image signal, encoded as a group of image data packets, and the annotation signal, encoded as a group of annotation data packets, are interleaved and transmitted with said audio data packets. The audio data packets are transmitted during a first time interval and the image and annotation data packets are transmitted during a second time interval following the first time interval. Control signals for terminal apparatus operation are encoded as control data packets and also transmitted during the second time interval. Another feature enables the transmission of audio data packets at a first periodic rate when the apparatus is in an image transmission mode and the transmission of audio data packets at a faster second periodic rate when the apparatus is not in an image transmission mode.

BRIEF DESCRIPTION OF THE DRAWING

In the drawing:

FIG. 7 shows the audio data packet format;

FIG. 8 shows the image, annotation and supervisory data packets;

FIG. 10 shows a flow chart describing the operation of receiving annotation data packets.

DETAILED DESCRIPTION

In the following detailed description, when reference is made to an element using a three digit number designation, that element is initially identified in the figure indicated by the first digit (e.g., enhanced telephone 101 is first identified in FIG. 1).

Figure 1:
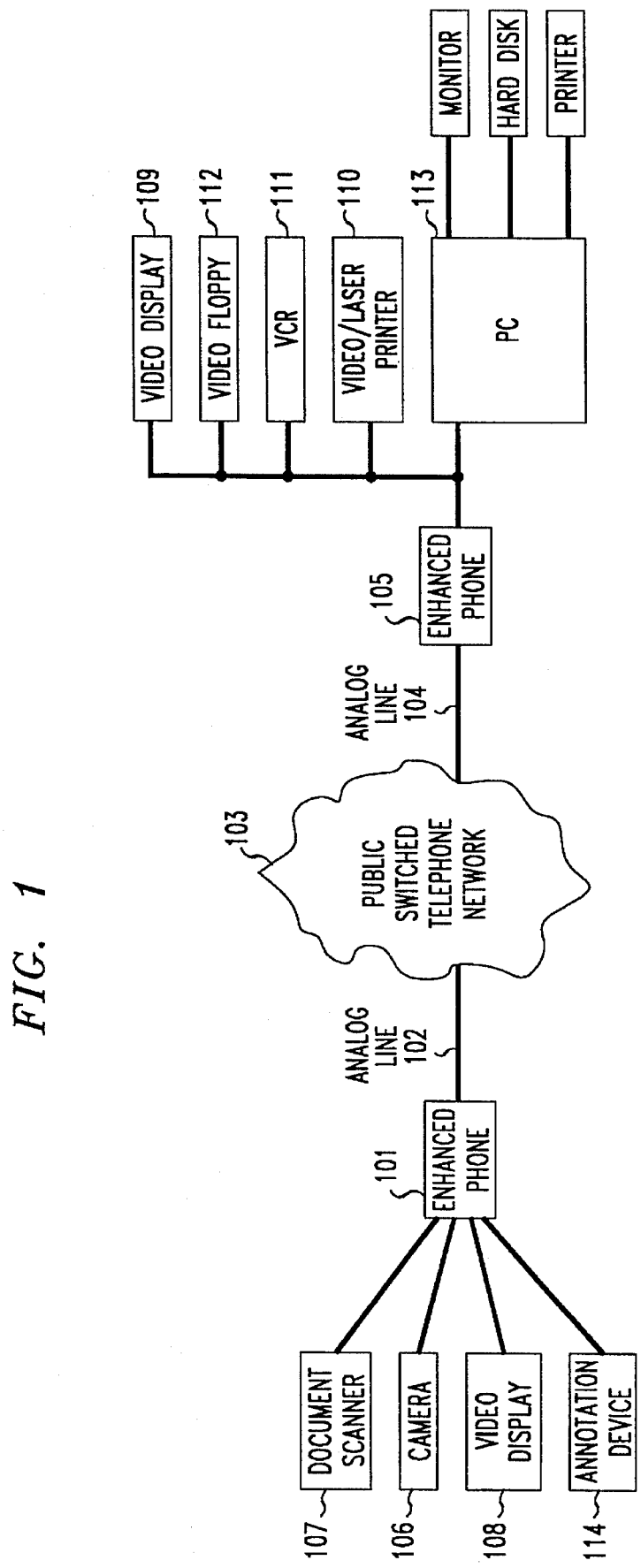
FIG. 1 is a block diagram of the present invention and how it may be utilized in a public switched telephone network.

Shown in FIG. 1 is an illustrative block diagram of a communication system utilizing enhanced phones (e.g., 101, 105) in accordance with the present invention. The enhanced phone 101 connects over an analog tip/ring line 102 through the public switched telephone network 103 and analog T/R line 104 to enhanced phone 105. The enhanced telephone 101 may acquire video inputs from a camera 106 or document scanner 107 and display video images on video display 108. The camera 106 may be a camcorder or still video camera. Camera 106 may be detached from the enhanced telephone 101 to take pictures and connected to enhanced phone 101 to send the pictures. Video display 108 may be a TV monitor or a personal computer (PC) monitor. An attached graphical annotation device 114 (e.g., stylus, mouse or equivalent) can be used to provide graphical annotation to the video image being displayed. This annotation signal may also be sent over the analog line by the enhanced telephone 101. The enhanced phone 101 includes the conventional components of a voice telephone including a dial pad, speakerphone and various feature buttons. Enhanced phone 101 also includes memory for storing a plurality of images including associated graphical annotation and voice annotation.

The enhanced phones 101 and 105 both operate in a full-duplex transmit and receive mode for all operating modes.

As will be described in more detail in later paragraphs, the enhanced phone, after first acquiring the audio, image and annotation signals, encodes the audio signal into a group of audio data packets and encodes the image and annotation signals into respective data packets which are then interleaved with the audio data packets and transmitted at a periodic rate over the analog line.

At the receiving enhanced phone 105, the audio data packets interleaved with the image and graphical annotation data packets are received over the analog line 104, decoded and outputted to the appropriate devices. The enhanced phone 105 displays images and annotation signals at a video display 109 or a monitor of PC 113. The enhanced phone 105 may store the video images in an internal memory or externally in a video floppy disk 112, VCR 111, or on the hard disk of a PC 113. Enhanced phone 105 can also provide a hard copy of the displayed image via a separate video or laser printer 110 or via a printer of PC 113. It should be noted that while, for illustrative purposes, different external apparatus has been described as connected to transmitting location enhanced phone 101 and receiving enhanced phone 105, any and all of the external apparatus may be connected to either enhanced phone 101 or 105.

The following briefly describes a typical communication sequence between enhanced phones 101 and 105. A user at enhanced phone 101 goes off hook and dials the telephone number of enhanced telephone 105 to establish a standard analog voice connection. Thereafter, the caller and called party may carry on a voice conversation. Once a voice connection is established either the caller or the called party may also establish an image connection by pressing a send image button at their respective enhanced phones. When the send button is pressed, following an established protocol, each enhanced telephone switches from the analog voice connection mode to a digital image connection mode. In the digital image connection mode an image signal which is obtained from camera 106, document scanner 107 or from an internal memory (e.g., a previously stored image), in addition to the voice signals, is sent over the public switched telephone network 103 to enhanced phone 105 where the image signal is displayed at monitor 109 and the voice signal outputted over speakerphone 251. The user at either end may suspend or cancel image transmission. In accordance with the present invention, users at either of the enhanced phones can continue voice communications and/or may perform graphical annotation to the video image being displayed at monitors 108 and 109. The voice communications and graphical annotation signals, from both sides, are transmitted and received in an interleaved fore, at to ensure that any user comments (voice annotation) made during the graphical annotation of the displayed video signal occur in synchronism with the graphical annotation. Moreover, if the video image is stored, the associated graphical annotation and voice annotation may, optionally, be stored with the video image. The graphical annotation may also be separately stored with or without the associated voice annotation. These stored images and graphical annotation may be randomly accessed and displayed. A voice or image telephone call is terminated in the conventional manner of a voice telephone call by hanging up the handset.

Figure 2:
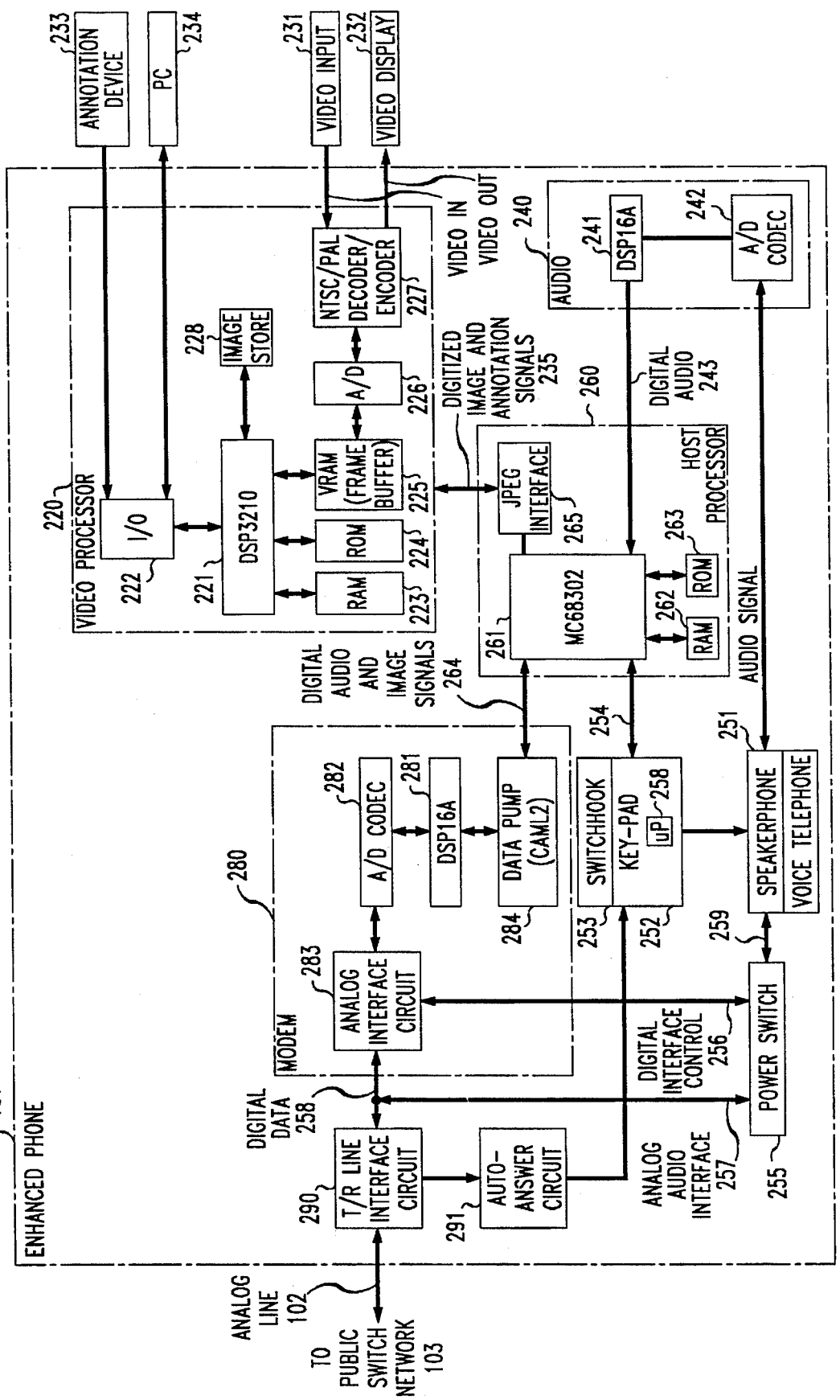
FIG. 2 is a block diagram of an enhanced phone in accordance with the present invention.

Shown in FIG. 2 is an illustrative block diagram of an enhanced phone (e.g., 101) useful for describing the operation of the present invention. The enhanced phone includes an analog video processor 220 which receives analog video signals from a video input device 231 (e.g., camera 106) and outputs analog video signals to a video output device 232 (e.g., video display monitor 109). These video signals may be conventional analog video signals in the standard NTSC or PAL video format. The analog video processing unit 220 also receives graphical annotation signals from annotation device 233 (e.g., pen mouse 114). Analog video processing unit 220 includes a digital signal processor 221, input/output controller 222, a video signal coder/decoder (codec), and memory including RAM, ROM and VRAM for storing data and programs utilized by the digital signal processor 221.

Video signals are originated by video input device 231, which are decoded by decoder 227, converted into a digital signal by A/D unit 226 and stored in frame buffer (VRAM) 225 and processed by digital signal processor 221. Graphical annotation signals received from annotation device 233 are coupled via I/O controller 222 to digital signal processor 221 for processing. Digital signal processor 221 compresses the image signals using the well-known JPEG international compression standard for photographic images with the image enhancements described later. Digital processor 221 also encodes and compresses graphical annotation data using well-known chain encoding. The image and annotation are associated using a procedure described later. This combined information is sent over path 235 to host processor 260. Digital signal processor 221 utilizes an image manager program which controls the processing of video signals received from video input device 231. A conventional display manager program controls the processing and display of text and/or graphics which are outputted to video display 232. An annotation manager program (FIG. 10) controls the processing of annotation signals received from annotation device 233. A peripheral manager program controls the I/O port controller 222 which interfaces to annotation device 233, printer 110, and PC 113 which may connect to the enhanced phone.

Connectivity with the PC 234 is provided through a parallel port to processor 221. A MicroSoft Windows 3.1 application (MicroSoft Windows 3.1 is a trademark of MicroSoft Corporation) on the PC is supported by an underlying parallel port driver and other utilities resident on ROM 124. The PC application initializes and starts up the parallel port for this activity.

The digital signal processor 221 provides the translation between JPEG interexchange file format and the .BMP file format for bit mapped images used for the Windows program. Once an image is transferred to a PC, the enhanced phone has no further control over that image, the PC application program takes over.

The user may retrieve an image from the PC disk in the "image window". It gets downloaded to the video processing unit 220 in an agreed upon format (e.g., .BMP). Once the image is in video processing unit 220, it is treated as if it came from a video input 231 (e.g., a camcorder).

The audio signal processing unit 240 receives an audio (voice) signal from speakerphone 251 or handset which is sampled (e.g., every 20 ms), digitized and encoded by codec 242 and compressed and processed by digital signal processor 241 into a 6.8 Kb/s compressed digital signal which is outputted over path 243. Digital signal processor 241 uses a Code Excited Linear Prediction Plus (CELP PLUS) algorithm to compress received voice signals. The CELP PLUS algorithm extracts speech parameters which are converted into 17 parameters of one byte each. Thus, each 20 ms of speech results in a 17 byte digital audio signal. Digital signal processor 241 controls the audio signal processing using an audio manager program.

Host processor 260 includes a processor 261, RAM 262 and ROM 263 memory for storing, respectively, data and the program for carrying out the functions of host processor 260. Host processor 260 receives the compressed digital audio (speech) signal over path 243 from the audio signal processing unit 240. Host processor 260 receives, via JPEG interface 265, the digitized compressed image and annotation signals received over path 235 from analog video processor 220. Host processor 260 also receives control signals, over path 254, from keypad processor 258, in response to user inputs at keypad unit 252 (shown in FIG. 3) and switchhook 253. These user inputs (e.g., button depressions) are used to establish the analog voice mode or digital communication connections of enhanced phone 101 to the public switched network 103. Processor 258 controls the operation of keypad 252 and speakerphone 251 using a voice telephone manager program. Host processor 260 outputs the digital audio and image signals over path 264 to modem 280.

Modem 280 includes a digital signal processor 281, codec 282, analog interface circuit 283 and data pump (CAMIL2)

284. The digital signal processor 281 of modem 280 operates under control of a modem manager program. Digital signal processor 281 uses the standard V.32 BIS modem with extensions to use a multi-dimensional coding at 2800 baud and 3200 baud to give 9.6, 14.4, 18.8 and 19.2 kbps data rates. The modem 280 implements a fast start-up process to minimize the amount of time the user waits to begin the image exchange session. A traditional start-up with line characterization process, including a phase-lockloop is used for this purpose.

Analog interface circuit 283, of modem 280, receives a digital interface control signal, over path 256, from power switch unit 255. This digital interface control signal, which is sent in response to the user pressing the send button 310, enables modem 280 to establish the digital connection mode so that digital data may be sent over the public switched network. Digital signal processor 281 controls codec 282 and data pump 284 to generate a digital data signal from the digital and audio signal received over path 264. The digital data signal is outputted over path 258 to a tip/ring line interface circuit 290. Modem 280, in response to the operation of the send button, sends a start signal over the public switched network 103 to the called enhanced phone. The start signal also disables echo suppression and equalization in the public switched network 103. Audio is muted during this digital connection set up time period. The modem at the called enhanced phone location is constantly listening to receive the start signal. Modem 280 tries to utilize the highest data rate (i.e., 19.2 Kb/s) for transmission. If the analog line (e.g., 102) cannot handle the highest data rate, then modem 280 tries succeedingly lower data rates until acceptable error rate performance results. This can happen, for example, if the line is noisy or if the telephone equipment at the calling and called location are incompatible.

Line interface circuit 290 interfaces the enhanced phone 101 to the analog line 102 and public switched network. Line interface circuit 290 receives analog audio signals, voice mode, over path 257, from power switch 255. Line interface circuit 290 also connects via auto-answer circuit 291 to the keypad circuit 252. Power switch 255 operates under control of a control signal received over path 259 from processor 258 (while processor 258 operates under control of host processor 260). When enhanced phone 101 is connected in a voice mode (i.e., the send video button has not been pressed), the audio (voice) signal from speakerphone 252 is coupled via power switch 255, over path 257, to line interface circuit 290. During a video digital connection mode, power switch 255 prevents the audio signal from speakerphone 25 1 from being outputted over path 257. Instead, the audio signal from speakerphone 25 1 is processed by audio processing unit 240 and host processor 260 and outputted together with image signals via modem 280. Power switch 255 controls the operation of modem 280 using digital interface control signal 256 under control of processor 258, the digital interface control signal 256 being generated by processor 258 in response to the operation of the send video button by the user.

Figure 3:
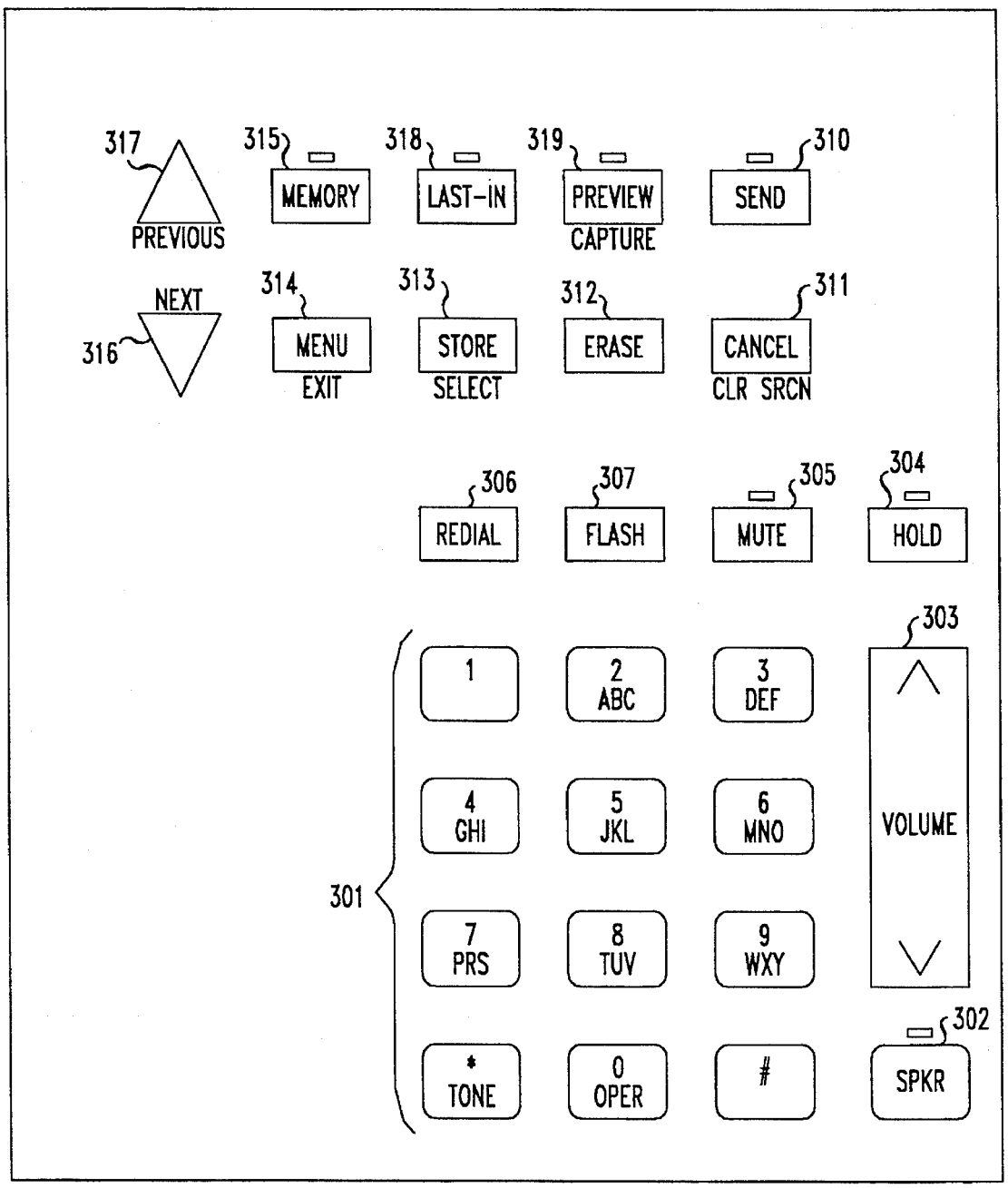
FIG. 3 is the layout of the keypad unit of the enhanced phone.

With reference to FIG. 3 we describe the keypad 252 of enhanced phone 101. The operation of keypad 252 and speakerphone 15 1 is controlled by processor 258 using a voice telephone manager program. Dial pad buttons 301, speakerphone 302, volume control button 303, hold button 304, mute button 305 and redial button 306 perform their well-known functions.

The send button 310 is used to change the operating mode of the image telephone from an analog voice call mode to a digital call mode. An LED associated with the send button will blink during the connection attempt and will remain lit once the connection is successful. The cancel button 311 is used to cancel the effect of the send button 310. That is, the cancel button 311 is used when the send button 310 is inadvertently pushed. The cancel button 311 will cause a call to remain in the digital mode although image transmission/reception will be stopped while voice transmission will continue. The flash button 307 returns the operation of enhanced phone 101 to the analog voice mode.

The store button 313 is used to store the image currently being displayed in the next available memory location. If, after storing this image, it is determined that the remaining available image stored space is less than that required to store an additional image, a warning message and an advice/help message will be displayed. The erase button 312 erases from memory the image currently being displayed. If the image received is from a remote location, the receive buffer is erased. If the image phone is in the local video mode, pressing the erase button 312 has no effect.

The menu button, when pressed, will cause a menu to be displayed. The menu allows the user to set up various options and image management functions. The dial pad 301 is used as a cursor pad for making selections of menu items.

The memory button 315 enables the display of all images stored in the enhanced phone 101. The next button 316 and the previous button 317 enable a user to select stored images for display.

The last-in button 318 shows the last image received from the remote side. The preview button 319 toggles between live video input and freezing a frame of the input video.

Enhanced Phone-Transmit Operation

With joint reference to FIGS. 1–3, 4a, 4b, 6–9 we describe the operation of the enhanced phone. Initially, the enhanced phone is in an on-hook condition as shown in step 401. In step 403, the enhanced phone goes to an off-hook condition in response to a user lifting the handset or pressing the speaker button 302. In step 405, if no dial tone is received the user returns the handset to the cradle or presses the speakerphone button 302 to return the enhanced phone to the on-hook condition. If dial tone is received, then in step 407, the user dials the number of the called party manually, using dial pad 301, or automatically, using the redial button 306. In step 409, if the called party does not answer the call, the caller returns the enhanced phone to the on-hook condition 401. If the called party answers the phone, then an analog voice mode connection is established between the called and calling locations. This analog voice mode may be established between a calling enhanced phone and a called enhanced phone or a called conventional voice telephone. The following discussions assume that both the calling and called locations have enhanced phones located thereat.

In step 413, if either the calling or called party does not desire to send an image then voice conversation continues, using conventional analog voice signals, until either party decides to terminate the conversation as shown in step 414. In step 413, if the caller decides to send an image to the called location then in step 415, the user selects a video source and then in step 416, presses send button 310. As previously described, the video source can be a camera 106, such as a camcorder, or a document scanning device 107. In step 417 the audio connection is muted and the enhanced phone issues a V.25 answer tone. Thereafter, the modem 180 of the enhanced phone initiates a V.32 BIS start-up sequence. As previously described this start signal disables echo suppression and equalization in the public switched network 103. In step 419, if the video connection is not successful then the analog voice mode returns and a suitable message is displayed on monitor 108.

If the video connection is successful then the physical layer steps 421 and 423 are performed. In step 421, the modems 280 at the called and calling enhanced phones communicate with each other to establish the optimum data rate for communications therebetween. The modems try to establish a digital connection at the highest data rate as previously described. Audio is muted during this set-up period. In step 423, the calling and called locations establish a link layer LAPB PLUS using standard HDLC protocol sequence. In step 425, if steps 421 and 423 are not successful then the analog voice mode returns. If success is reached in step 425, then the link layer is complete and in step 427 a network layer X.25 is established. Thereafter, a restart indication message is sent and the enhanced phone waits for a confirmation message. If step 427 is unsuccessful, then the analog voice mode is re-established. If success is reached in step 429, then the network layer is complete and the off-hook digital communication mode is established, in step 431, and the enhanced phone is ready to send voice and image signals. The enhanced phone is now in the application layer sequence. In step 432, if the flash button is pressed control returns to step 411, otherwise step 433 is performed.

In step 433, enhanced phone determines if an image is to be sent. If the user did not press the send image button, no image is to be sent, then in steps 435 and 437, processor 261 sends audio data packets at the fast update rate (600 of FIG. 6). In step 437, the audio signal (generated in step 440) is encoded into audio packets and interleaved with any encoded control signal packets (step 438) and/or encoded annotation signal packets (step 439) and sent over analog line 102. This interleaving of the audio signal packets with annotation signal packets results in approximate synchronization between the two signals. Thereafter, control returns to step 432.

Figure 6:
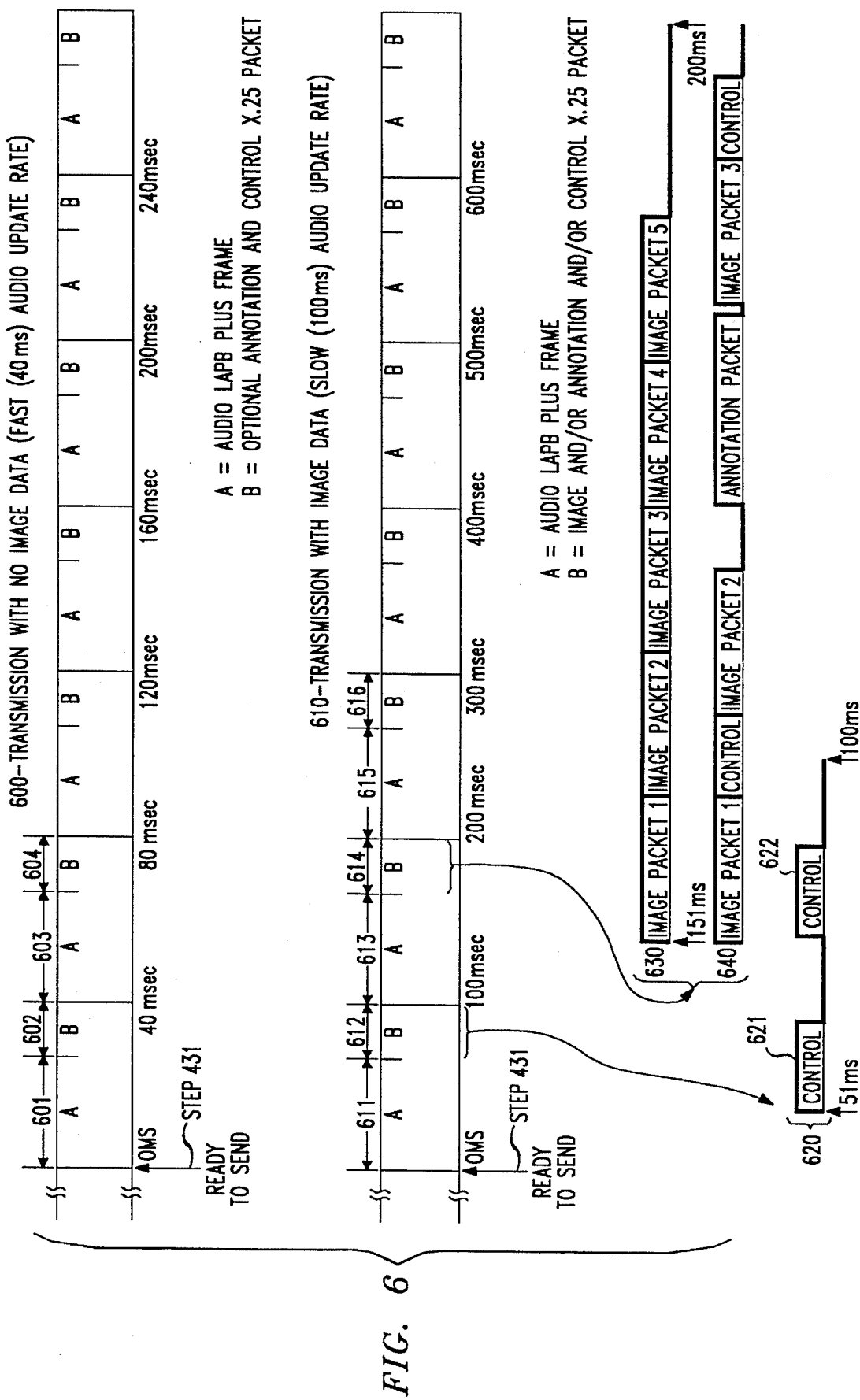
FIG. 6 shows various transmission procedures utilized by the present invention.

With particular reference to FIG. 6, we see that if no image transmission is to occur (no image command sent in step 433), digitized audio samples are set periodically (during time period A) at a first predetermined rate (40 ms in our example). As previously described, audio processing unit 240 creates one 17-byte digitized audio sample for each 20 ms of analog audio signal. The two 17-byte digitized audio samples, representing two 20 ms analog audio signal intervals, from processor 241, are packaged by processor 261 into an audio data packet message 710 of FIG. 7.

With reference to FIG. 7 we describe the application layer packet messages. Shown in 710 is a link layer, audio data packet message including an LAPD and audio frames (which are generated in step 440 and sent during step 437). The parts of the audio frame are shown by 720. The audio frame includes flag segment 721, address segment 722, control segment 723, data segment 724, error checking segment 725 and flag segment 726. The flag segment 721, one byte long, identifies frames. The address segment 722, a two-byte address field that identifies audio frames. Control segment 723, one byte, provides flow control signals and defines the frame type as data or control. The error checking segment 725 includes a two-byte cyclic redundant code (CRC) for error checking purposes. A frame of audio is discarded if an error is detected in the CRC. The data segment 724 is 34-bytes long and includes the two 17-byte audio samples. Another flag segment 726, one byte long, completes the audio frame 720. Thus, the audio frame 720 is 41 bytes long.

If we assume that the data transmission rate is 14.4 Kbps the audio frame 720 takes about 23 ms to transmit. With reference to FIG. 6, the audio frame 720 occupies segment A, 601, of the "no image" transmission sequence 600. Thus, there are 17 ms left (segment B, 602) before the next audio frame or message 603 is to be sent. This segment B is used to send annotation or control signals (of steps 439 and 438, respectively). If a user presses one or more buttons, these buttons are each encoded using one or more bytes by key processor 258 and, in steps 437 and 438, sent as part of a control frame 720 (the control field 723 indicates that it is a control message) in segment B along with the audio frame 720 in segment A. The control message frame would have the same format as 720, with data segment 724 including control data rather than digitized audio.

Additionally, in step 439, if a graphical annotation signal has been produced by the user (FIG. 9, discussed later, describes this process) it can also be sent by itself in a separate annotation frame message 720 in segment B. Note, both the annotation signal and control signal are sent as separate frame messages in segment B. Note, the control field 723 also specifies if the data field 724 is control or annotation data. If there is not enough time to send both the control signal and annotation signal in segment B 602, then one of them is sent in the next segment B 604.

Returning to FIG. 4, step 433. If processor 261 determines that the user desires to send an image then enhanced phone 101 uses an audio signal update rate of 100 ms. Thus, the audio transmission, step 442, occurs with image data transmission as shown by 610. Using the 100 ms periodic audio signal update rate means that five audio signal samples are sent periodically during each segment A (611,613,615 etc.) while image data, control signal or annotation signals are sent in segment B (612, 614, 616 etc.). Since five audio signal samples are being sent every 100 ms, rather than two audio signal samples every 40 ms, the quality of audio at the receiving enhanced phone may be somewhat lower. Note, that all of the audio samples are still sent, it is just that they may not be as synchronized to the image or annotation signal being sent.

In the "transmission with image data" mode, processor 261 collects five audio samples (20 ms each) before transmitting them in segment A. Thus, 5×17 bytes or 85 bytes is the size of the data field 724 of FIG. 7. With reference to 611 of FIG. 6, the overall length of the segment A message is then 92 bytes long and takes about 51 ms to transmit. Thus, 49 ms remain to transmit any image, control or annotation signals in segment B (612).

As shown by 620, the first segment B (612) contains the request to send control signal 621 (step 433 of FIG. 4) and, if acknowledged properly by the remote enhanced phone, the "start image command" 622 (step 449 of FIG. 4).

After the next five audio samples are sent in segment A (613), the image packets may be sent in segment B (614, 616 etc.). With reference to 630 we show a typical segment B including five image packets (image packets 1–5). After five image packets are sent, the host processor 260 waits for an acknowledgment that they were received correctly. Each image packet is sent using a network layer format 810 of FIG. 8 to provide the proper acknowledgment protocol required by X.25. Image data is sent 12 bytes at a time (user data 817) and the remaining fields 811–816 require four bytes.

With particular reference to FIG. 8 we describe the image, annotation, and supervisory messages as shown by 810. Message 810 includes a plurality of segments including group frame identity (GFID) 811, logical group 812, logical channel 813, send sequence 814, receive sequence 815, M bit 816, and user data 817. The GFID 811 identifies the group frame number. The logical group identifies the group number of the signal source. The logical channel number 813 specifies one of a plurality of channel types. These channel types may be a supervisory, image or annotation type each identified by a unique binary number. The logical channel 813 type identifies the type of user data field 817 being sent in this message frame 810. Thus, if the logical channel indicates a supervisory type message then supervisory data is in data field 817. Examples of supervisory commands include key button depressions, exchange of set capability, and permission to send image messages. Graphical annotation signals are discussed in a later paragraph. The send sequence 814, is an identifying number for this message 810. Receive sequence 815 tells the far end what was the last correctly received message from the far end. The M bit 816 is a continuation bit which signals that another frame will follow.

The network layer message 810 enables the local enhanced phone 101 to know which was the last correctly received image packet by enhanced phone 105. Thus, any incorrectly received image packet and subsequent image packets may then be retransmitted as part of the next five image packets sent during the next segment B. For example, with reference to FIG. 6, if packets 1–5 were sent in the prior segment B (614) and packet 4 was in error, then during the next segment B, 616, host processor 261 would re-transmit packets 4 and 5 and send new image packets 6, 7 and 8.

Returning to FIG. 8, the network layer message 810 is formatted including one 12-byte image packet 817 and four bytes of network layer overhead (fields 811–816). The network layer message then becomes the data field 724, of the link layer message 720. Hence, the link layer message 720, in the image data mode, includes 23 bytes (16 plus 7 overhead) per image packet. Up to 5 image packets can be sent in one segment B (614) interval, as shown by 630. Thereafter, the transmitting enhanced phone awaits an acknowledgment signal from the far end enhanced phone.

Alternatively, as shown by 640, a segment B may include a combination of image packets, control signal and annotation signals.

Returning to our discussion of FIG. 4, in step 443, the calling enhanced phone issues a request to send image message and waits for a permission granted message from the called enhanced phone location. If permission is denied, in step 445 then a message is displayed, in step 447, on the monitor at the enhanced phone calling location. If permission is granted, in step 445, then a start image command is sent, in step 449, and the enhanced phone sends image packets. In step 451, if no acknowledgment signal is received from the far end then step 449 is repeated. If an acknowledgment signal is received, then in step 453 a group of image packets (5 in our example) is sent (previously described and shown by 630 of FIG. 6). In step 455, the enhanced phone 101 waits for a positive acknowledgment. If, in step 457, an X.25 error message is not received then, in step 459, the next five image packets are sent.

If an X.25 error message is received, then in step 461 (as previously described in 610 of FIG. 6) five image packets including all packets following the last correctly-received image packets are sent.

In step 463 it is determined if an image end marker is detected, indicating the end of an image. If no image end marker is detected, then control returns to step 449. If an image end marker is detected then, in step 469, the enhanced phone sends an end image command. Thereafter, in step 467, if an acknowledgment signal is not received, then step 465 is repeated; otherwise, in step 469 a suitable message is outputted on the monitor and the enhanced phone stays in the digital mode. Thereafter, if another image transmission is desired by the user then control returns to step 433.

Enhanced Phone-Receive Operation

Figure 5A:
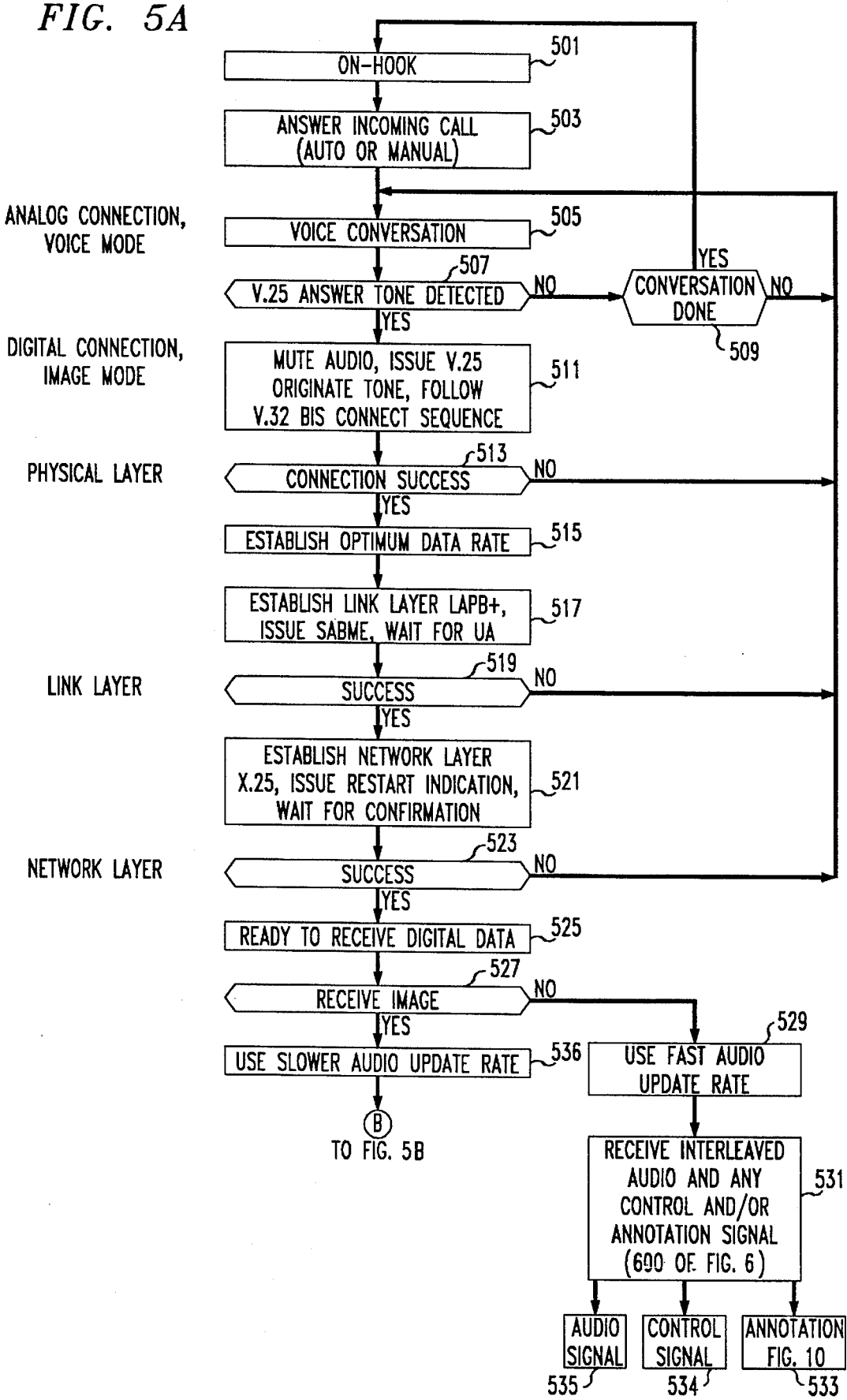
FIGS. 5A and 5B show flow charts describing the receive operation of the enhanced phone.
Figure 5B:
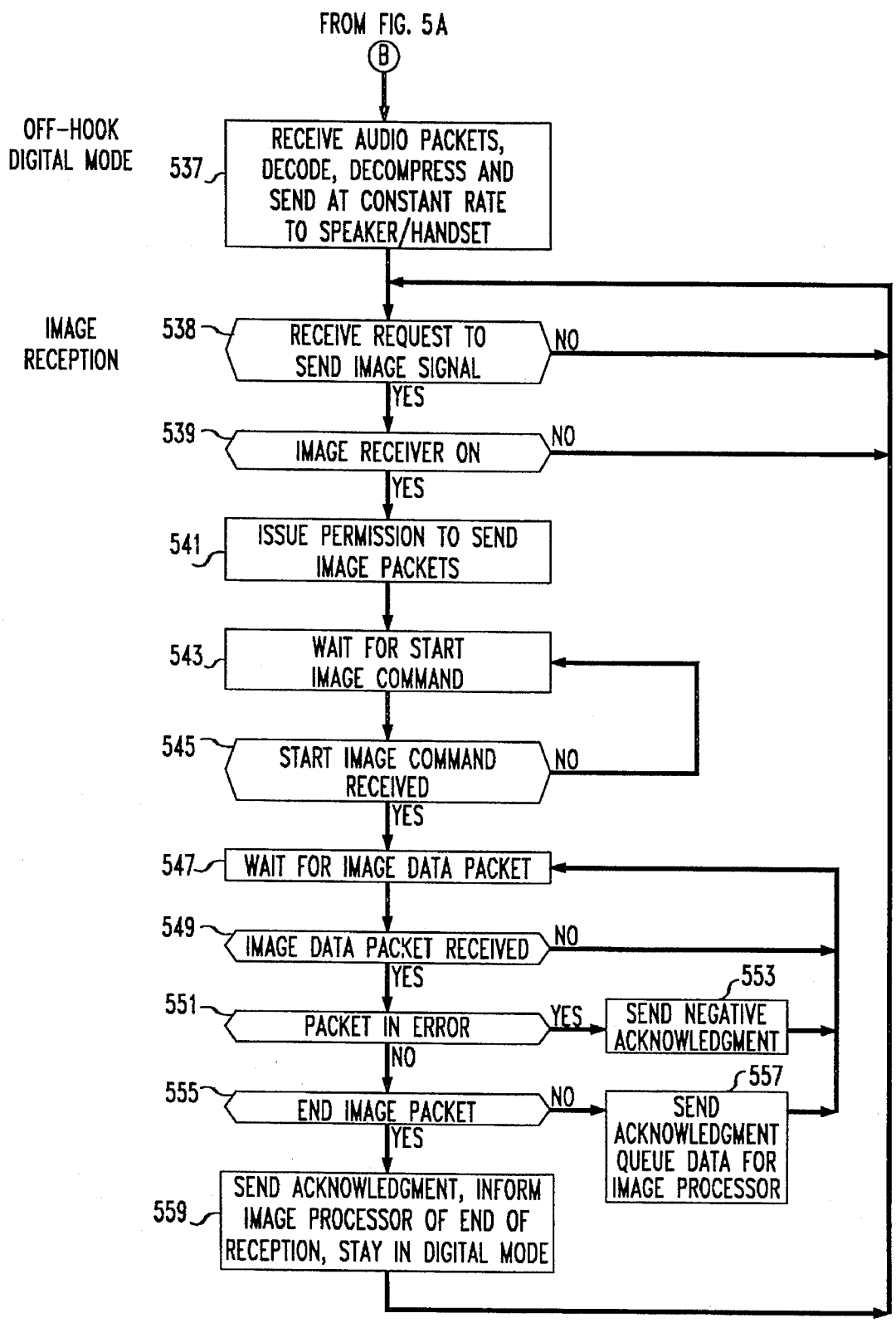

With reference to FIGS. 5A and 5B, we describe the operation of an enhanced phone in the receive mode. In step 501, the enhanced phone is initially in an on-hook condition. In step 503, the enhanced phone goes to an off-hook condition to answer an incoming call in response to a user lifting the handset or pressing the speaker button 302 or in response to the auto-answer circuit which electrically simulates the user lifting the handset through software control signals to the voice telephone processor. The enhanced phone may be placed in an auto-answer mode (using auto-answer circuit 291 ) whereby an off-hook condition occurs in response to an incoming ringing signal at the T/R interface. Furthermore, should the enhanced phone detect a termination of the digital connection, it will automatically return to the on-hook state. In step 505, an analog voice mode connection is established between the calling and called locations and voice conversation commences. In step 507, the enhanced phone receives signals and looks for a V.25 answer tone. If no answer tone is detected, then in step 509 it is determined if voice conversation is completed. If not, then control returns to step 505. If voice conversation has been completed, then enhanced phone returns to the on-hook condition in step 501.

If an answer tone is detected, in step 507, then enhanced phone enters a digital connection mode. In step 511 an image connection begins. At the receiving enhanced phone, audio is muted and a V.25 originate tone is issued and the enhanced phone follows a V.32 BIS connect sequence. In step 513, the enhanced phone determines if a physical layer connection success has been achieved. If not, control returns to step 505. If a successful connection is established, then in step 515 an optimum data rate is negotiated between the modems of the transmitting and receiving enhanced phones. In step 517, the link layer LAPB PLUS is established using standard HDLC protocol sequence. In step 519 it is determined if the link layer was successfully established. If no success was reached in step 519 then the enhanced phone returns to the analog connection voice mode in step 505. If success was reached in step 519, the network layer X.25 is established in step 521. The enhanced phone then issues a restart indication signal and waits for a confirmation signal from the remote enhanced phone. In step 523, if the network layer was not established, then the enhanced phone returns to the analog voice mode in step 505.

If the network layer was established in step 523, then in step 525 the enhanced phone is ready to receive or send digital data. This is referred to as the off-hook digital mode.

In step 527, if an image is not to be received, then the receiving enhanced phone enters a fast audio update rate mode (previously described with reference to 600 of FIG. 6). In this fast audio update rate mode, step 531, audio packets are sent every 40 ms interleaved with control and/or annotation signals. In step 533, the audio data packet is processed, by 240, and outputted over speakerphone 251. In step 534, the control data packet signal is processed by host processor 260. In step 535, the annotation data packet is processed by video processor 221, as shown in FIG. 10.

In step 527, if an image is to be received, then, in step 536, the receiving enhanced phone enters a slower audio update rate mode (previously described with reference to 610 of FIG. 6). In step 537, the enhanced phone can receive audio packets, decode and decompress them, and send audio signals to the speaker/handset of the enhanced phone.

In step 538, the enhanced phone is looking to detect a request to send signal from the remote enhanced phone. Step 538 continues until the request to send image signal is received. If the request to send signal is received the enhanced phone enters the image reception _mode. In step 539 it is determined if the image receiver is on. If the image receiver is not on control returns to step 538, otherwise control transfers to step 541. In step 541, the enhanced phone issues a permission to send image packet signal. In step 543, the enhanced phone waits for a start image command. In step 545, it is determined if a start image command has been received. If not, control returns to step 543. If a start image command was received, then in step 547 the enhanced phone waits for an image data packet. In step 549, the enhanced phone detects the presence of an image data packet. If no image data packet is received, control returns to step 547 otherwise control passes to step 551. In step 551 it is determined if the packet is received in error. If the packet is received in error, then the enhanced phone sends a negative acknowledge signal in step 553 and control transfers to step 547. If the image data packet is not received in error, then the enhanced phone looks to detect an end image data packet. If no end image data packet is received, then in step 557 an acknowledgment signal is sent, the image data packet is stored in a queue for image processing. Control then returns to step 547. If an end image packet is received then in step 559 an acknowledgment signal is sent and the image processor is informed of the end of reception. Thereafter, the enhanced phone stays in the digital mode and control is transferred to step 538. If the digital mode ends, the enhanced phone enters the analog voice only mode automatically. If the enhanced phone is in auto-answer mode (unattended) and the digital mode is ended, the analog voice mode is by-passed and on-hook state is established.

Annotation

Figure 9:
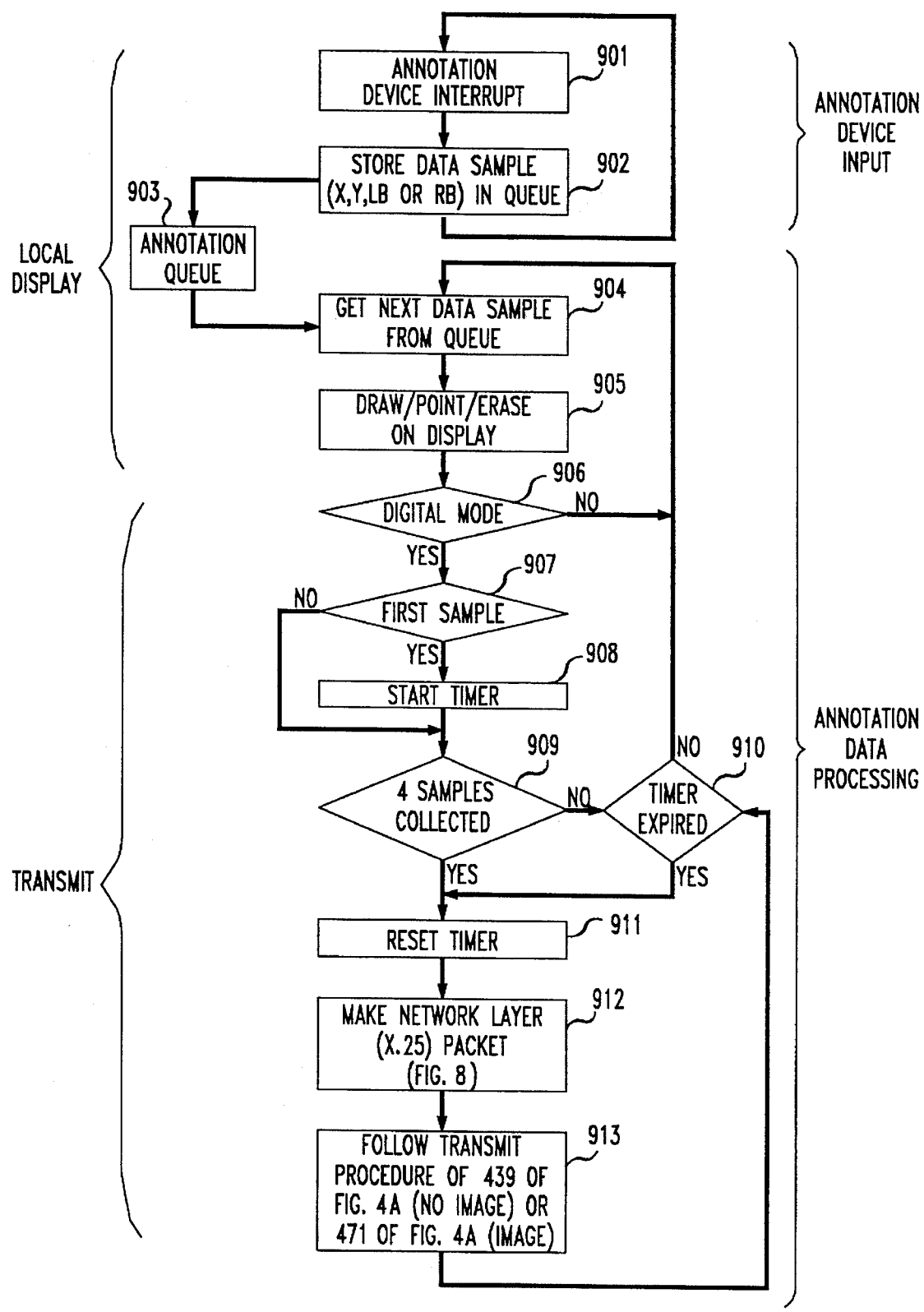
FIG. 9 shows a flow chart describing the operation of transmitting annotation data packets.

With reference to FIG. 9 we discuss the local and transmit graphical annotation operation of enhanced phone 101. Graphical annotation enables the user to point or draw onto the displayed image and thereafter to selectively erase the annotation if desired. Annotation is stored in the standard manner whereby movement is broken down into descending chains. Chain codes represent change in position from one element to another. Since the line width of annotation is wider than one pixel, the line width is encoded using run length encoding. Chain codes are used to represent the leading edge of the annotation curve, while run length represents the width.

In the following discussion, we will assume that the annotation device 114 is a mouse device. In step 901 an interrupt is generated periodically by the mouse device (every 20 or 30 msec), if it has moved or one of its buttons has been pushed. If the mouse has moved, a timer is started, and in step 902 mouse data is collected and stored in a first-in-first-out annotation queue 903. The mouse data includes an x and y coordinate information as well as left button (LB) and right button (RB) state information, totalling 3 bytes of information. The steps 901 and 902 are repeated so as to collect data and store it in the queue.

Figure 4A:
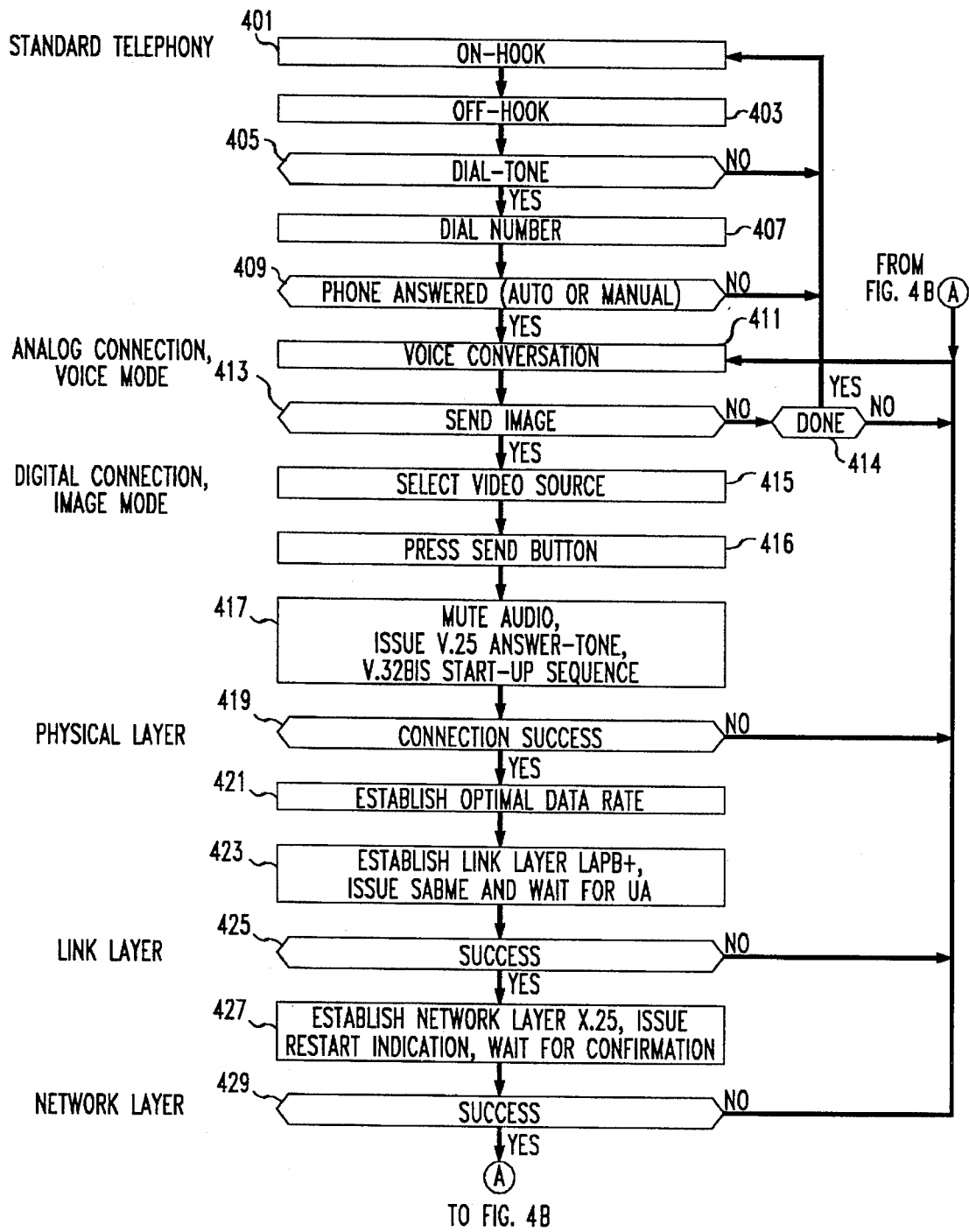
FIGS. 4A and 4B show flow charts describing the transmit operation of the enhanced phone.
Figure 4B:
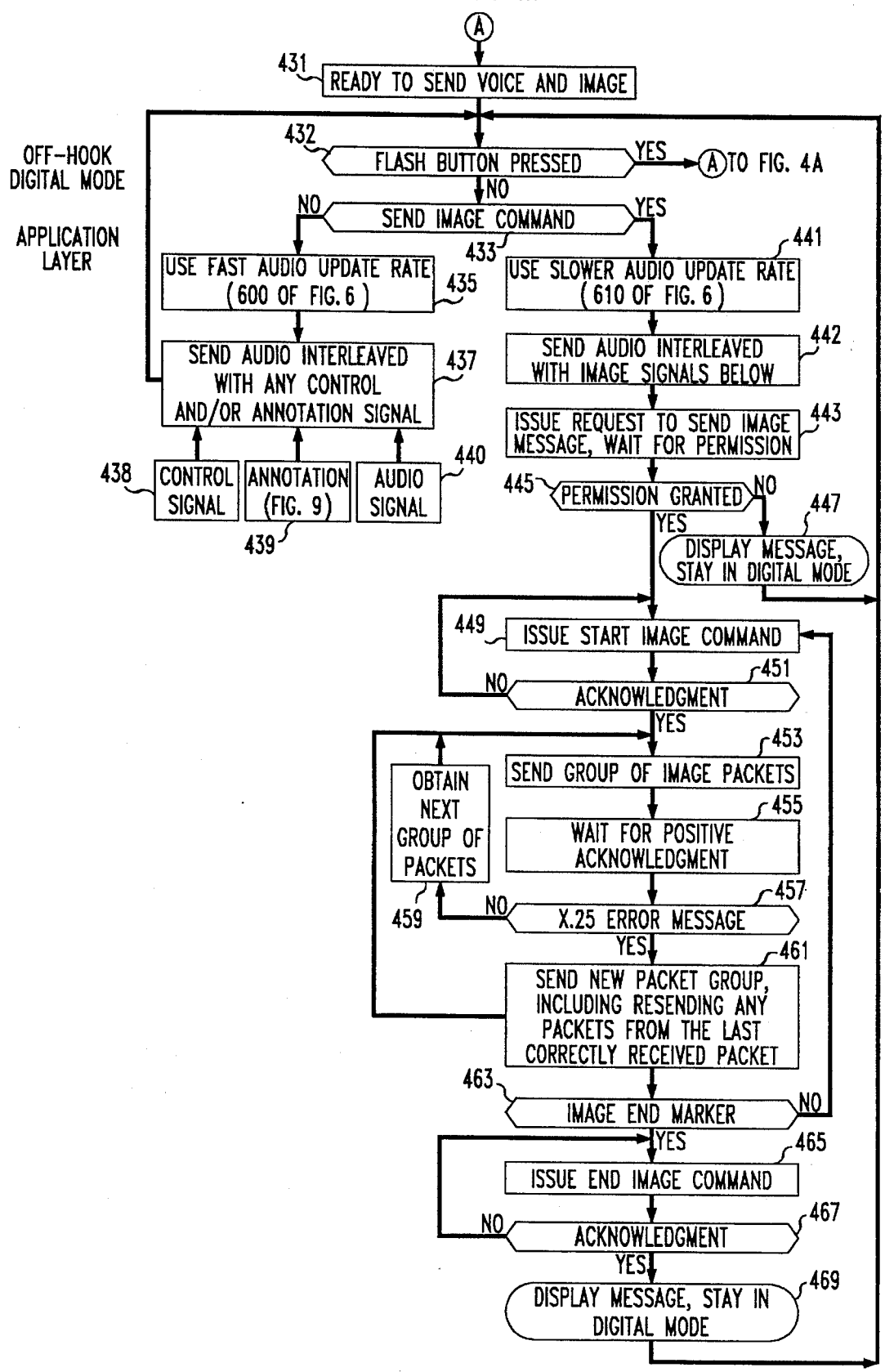

The cursor does not draw but only points on the screen when the user releases the depression of the left button (LB). In step 904, processor 221 reads data bytes sequentially from the queue 903 for processing and interpreting. The color and origin is set and the data samples are operated in step 905, by processor 221 to point, to draw, or to erase on the video display 108 associated with the enhanced phone 101. In step 906 it is determined if the enhanced phone is in a digital mode or analog mode. If not in a digital mode, then the enhanced phone is in the local display image mode and the annotation is displayed locally on display 108. If enhanced phone is in the digital mode then, in step 907, it checks if it is a first sample of an annotation packet. If so, a timer is started in step 908, otherwise step 909 is performed. Step 909 is checked to see if four samples have been collected. If not, then the timer is checked in step 910. If the timer has not expired, then step 904 is performed to obtain the next sample. By this procedure, each annotation sample is guaranteed to be received at the remote site in less than the timer setting. It ensures the real time display of annotation data at both locations. If four samples have been collected, step 909, or if the timer has expired, step 910, then the timer is reset, in step 911. When the timer expires in step 910 the number of samples collected will be greater one but less than four. In step 912, the data samples collected in step 909 or 910 are packaged into a network layer packet as shown by the message structure 810 of FIG. 8. In step 913, the network layer packet of FIG. 8 is packaged in the data field 724 in the X.25 message 710. In step 9 13, the data transmission procedure step 439 of FIG. 4a is followed if no image data is to be transmitted. In this "no-image" transmission mode audio packets are interleaved with the annotation packets and transmitted as shown in 600 of FIG. 6. If image data is to be transmitted, then an image data transmission procedure shown in step 47 1 of FIG. 4a is followed. In the "image" transmission mode audio packets are interleaved with annotation packets and transmitted as shown in 610 of FIG. 6.

With reference to FIG. 10 we describe the receive annotation operation of the enhanced phone. In step 1001, the remote enhanced phone 105, receives information in the X.25 format of FIG. 7 in either of the formats shown in 600 or 610 of FIG. 6 (as determined by the transmitter enhanced phone 101 ). According to the present invention, the transmitter location selects the format (600 or 610) and the receiver location transparently decodes the format without negotiating the format with the transmitter. If no image data was transmitted, then annotation data packets are received interleaved with the audio data packet using the transmission format, used by the transmitter, shown by 600 of FIG. 6. If image data was transmitted, then annotation data packets are received interleaved with the audio data packets using the transmission format, used by the transmitter, shown by 610 of FIG. 6. In step 1003, the annotation data packets, received in the format shown by 810 of FIG. 8, are decoded by processor 221. In step 1005, the annotation data items are stored in a first-in-first-out queue 1006 (223 of FIG. 2). In step 1007, processor 221 sequentially obtains the next data item from the queue 1006, processes it and in step 1009 points, draws, or erases on the display (232 of FIG. 2).

Image Storage

The enhanced phone provides innovative image storage management using a unique "unified file format". The unified file format includes a data storage header that includes fields that identify the full image, a small icon of that image (for browsing and selection), bitmapped compressed graphics annotation data and associated compressed audio data (for messaging, voice annotation and other applications). This data storage header is flexible enough to incorporate more data types and synchronization of voice and graphical annotation.

The unified file used by the enhanced telephone has the following fields:

header_size: This field specifies the size of the header in bytes.

header_rev: This field specifies the version number.

file_size: This specifies the total size of the unified file in bytes.

image_size: This field specifies the total number of bytes in the compressed image data.

ps_size: This field indicates the size of the postage stamp image data in bytes.

annot_size: This field specifies the size, in bytes, of the graphical annotation data.

voice_size: This field specifies the size of audio annotation data in bytes.

raw_x_size: This field specifies the original image width in number of pixels.

raw_y_size: This field specifies the original image height in number of pixels.

x-subsample: This field specifies subsampling done along the width of the original image.

y_subsample: This field specifies subsampling done along the height of the original image.

x_offset: This field specifies the x coordinate of the original image in pixels.

y_offset: This field specifies the y coordinate of the original image in pixels.

ps_offset: This field specifies the address offset for the start of postage stamp image data.

image_offset: This field specifies the address offset for the start of compressed image data.

annot_offset: This field specifies the address offset for the start of compressed annotation data.

voice_offset: This field specifies the address offset for the start of compressed audio data.

image_format: This field specifies the file format for the compressed image data and the information about the number of components in the original image and their description.

annot_format: This field specifies the file format for the compressed annotation data.

voice_format: This field specifies the file format for the compressed audio data.

reserved1: This field can be used for any future extensions.

Graphical Annotation, using annotation device 133, lets the users at the enhanced phone locations at both ends of the call to point to a specific point and/or draw on the monitor screen. The cursor remains visible over almost all background images being displayed on the monitor. The cursors from two sides are differentiated. The basic graphical annotation functions provided are: point, draw a (small) line, erase a (small) area. Images and graphical annotation are treated independently and are not associated with each other until the storage time. During storage, the annotation becomes part of the image and is transmitted, retrieved or erased with it. The annotation present on the screen is cleared automatically by a new incoming image. To clear the annotation on the remote screen, one needs permission from the remote device to do so.

Annotation can be done in any of the normal modes of the device. Its transmission, however, is treated differently depending upon the mode. In the "on hook" mode, there is clearly no transmission possible. In the "off hook analog" mode, the annotation is local also. In the "off-hook digital" mode (which starts when the send button is pressed after calling up the other side) the annotation is transmitted as data to the remote enhanced phone and is displayed on screen in realtime. Both parties can draw simultaneously and both screens will display the same drawing (if digital connection is maintained). Annotation by each side is differentiated for display but any operations like erase and store are performed on the combined annotation data as it is displayed on the screen. Both sides can be annotating simultaneously with the results showing up on both screens. Local cursors, annotation and erasers show up with white interiors and black borders. Remote cursors, annotation and erasers show up with black interiors and white borders.

The pointing annotation device inputs are converted locally to absolute coordinates and button presses are detected. These are then used to draw (or erase) annotation locally. If there is an image connection (and no image transmission) the readings are packed into four bytes and sent to the other side where they are processed in the same way.

Clear screen key-pad button applies to the video image and the annotation. Through the use of a menu, the user can clear annotation only, image only, or both the image and the annotation. In addition, annotation can be cleared as follows:

The right button of the pointing device is programmed to be 'Erase Annotation' button. When the right button is pressed, the cursor changes to a small box (called 'erasure'). If the button is kept pressed and the mouse is dragged, the drawing under the erasure box will be erased. The eraser does not differentiate between the local and the far end annotation. It just erases the overlay data (exposing the underlying image, if there is one).

A double click of the right button clears all annotation from the local screen but the remote side is treated according to the set up option in its menu interface. It can either permit or refuse permission to clear its annotation by the other side. The permission to clear annotation by the other party can be changed at any time.

Through the menu interface, the user can store the image only, annotation only, or image and annotation both. Since annotation can be erased, it is not stored as a sequence of mouse readings but rather is treated as an image. The user is able to turn off and on the real time transmission of its annotation. This is the local annotation mode.

Pressing both buttons of the pointing device together brings up a row of on-screen soft function keys. One of the keys is labeled "Text". Selecting this button opens a text input box and an on-screen alphanumeric key-pad (including back space and new-line keys). The user can select one character at a time from the key-pad that shows up in the text box. The user is able to move and resize the text box.

The enhanced phone has the unique ability to store and recall multiple images and associated graphical and audio annotation. Three buttons assist in the memory recall functions: memory 315, next 316, previous 317. If the user wants to display a specific memory image of interest, a sequential method is possible: the memory button is used to select memory images as video source and the buttons labeled "next" and "previous" are used to access and display successive images one at a time until the desired image is selected by visual inspection. The enhanced phone (or any other similar device) stores images in its internal memory in the encoded and compressed form. In order to be displayed, an image has to be accessed, decoded and decompressed.

If an image is being displayed on the screen, the operation of send button results in the image on the screen being transmitted to the remote enhanced phone. After the send operation is complete, the user can transmit another image by selecting it using the next or previous button and pressing the send button again.

Similarly, the Store and Erase operations are carded out on the image when they are pressed. Note that the image is stored in the next available memory location. If no empty memory slot is available, the image is stored anyway overwriting the "First-In" image in memory. The image memory therefore works in a circular buffer manner with First-in, First Out strategy i.e. the latest group of images are stored. The Erase operation does not leave any holes in the memory. The slots are reorganized each time an Erase operation is carried out.

While the present invention has been described using a particular digital data communication format (X.25), it should be understood that other digital data formats may be utilized. Additionally, while the fast and slow audio update (periodic) rates in the disclosed embodiment were selected to be 40 and 100 msec, respectively, it should be understood that these update rates are merely representative of the various rates that may be utilized depending on the desired operating characteristics of the apparatus. Moreover, the number of audio data packets, image data packets, and annotation data packets grouped together for transmission may also be varied depending on the audio update rates and other desired apparatus operating characteristics.

What has been described is merely illustrative of the application of the principles of the present invention. Other arrangements and methods can be implemented by those skilled in the art without departing from the spirit and scope of the present invention.

We claim:

1. A telephone apparatus comprising means for acquiring an audio signal, image signal and graphical annotation signal, first means for encoding said acquired audio signal into a group of digital audio signals for periodic transmission at a first periodic rate over an analog line connected to said apparatus, second means for encoding said acquired image signal, as a group of digital image signals, and for encoding said acquired annotation signal, as a group of digital annotation signals, and for transmitting said digital image signals and digital annotation signals interleaved with said digital audio signals over said analog line such that the digital audio signals are transmitted in synchronization, within a predetermined tolerance, with the digital image signals and digital annotation signals, and wherein said digital audio signals are transmitted during a first time interval and wherein said digital image signals and digital annotation signals are transmitted during a second time interval following said first time interval.

2. The telephone apparatus of claim 1 wherein said second encoding means encodes the digital image signals and digital annotation signals with an identifier which identifies them as digital image signals or digital annotation signals.

3. The telephone apparatus of claim 1 wherein said first encoding means encodes each digital audio signal with a unique identifier.

4. The telephone apparatus of claim 1 further comprising means for establishing an image transmission mode and wherein said first means is responsive to an established image transmission mode for transmitting digital audio signals and digital image signals at said first periodic rate.

5. The telephone apparatus of claim 4 including third means, responsive to the absence of said image transmission mode, for transmitting said digital audio signals at a second periodic rate.

6. The telephone apparatus of claim 5 including means for generating an annotation signal sample if said annotation signal changes within a predetermined time period and for forming an annotation data block for each annotation signal sample and wherein each digital annotation signal includes a plurality of said annotation data blocks.

7. The telephone apparatus of claim 6 wherein at least one of said group of digital annotation signals includes a predetermined maximum number of annotation data blocks.

8. The telephone apparatus of claim 7 wherein at least one of said group of digital annotation signals includes all annotation data blocks generated within a predetermined time interval.

9. The telephone apparatus of claim 1 including means for generating a control signal, and fourth means for encoding and transmitting said generated control signal as a digital control signal which is transmitted during said second time interval, each digital control signal including a unique identifier.

10. The telephone apparatus of claim 9 wherein said digital control signal includes a request to send an image signal.

11. The telephone apparatus of claim 9 wherein said digital control signal includes a request to start an annotation signal.

12. The telephone apparatus of claim 9 wherein said digital control signal includes a request to erase an annotation signal.

13. The telephone apparatus of claim 9 wherein said digital control signal includes a flash signal indicating a request to return to the analog voice mode.

14. The telephone apparatus of claim 9 further comprising means for receiving a digital control signal over said analog line and decoding it into a received control signal and means for controlling an operation of said apparatus in response to said received control signal.

15. The telephone apparatus of claim 14 wherein said transmitted control signal is a request to send an image signal, said received control signal is an acknowledgment signal received in response to said request to send an image signal, and wherein said apparatus transmits said digital image signals in response to a positive acknowledgment signal.

16. The telephone apparatus of claim 14 wherein said transmitted control signal is a request to send an annotation signal, said received control signal is an acknowledgment signal received in response to said request to send an annotation signal, and wherein said apparatus transmits said digital annotation signals in response to a positive acknowledgment signal.

17. The telephone apparatus of claim 14 wherein said transmitted control signal is a request to erase an annotation signal, said received control signal is an acknowledgment signal received in response to said request to erase an annotation signal, and wherein said apparatus transmits an erase annotation signal in response to a positive acknowledgment signal.

18. The telephone apparatus of claim 14 wherein said transmitted control signal is a flash signal, said received control signal is an acknowledgment signal received in response to said flash signal, and wherein said apparatus establishes an analog voice mode in response to a positive acknowledgment signal.

19. The telephone apparatus of claim 1 wherein said first encoding means processes the acquired audio signal into blocks of digitally encoded compressed data, each digital audio signal including a plurality of said data blocks.

20. The telephone apparatus of claim 1 including
means for generating an annotation signal sample if said annotation signal changes within a predetermined time period and for forming an annotation data block for each annotation signal sample and wherein each digital annotation signal includes a plurality of said annotation data blocks.

21. The telephone apparatus of claim 20
wherein at least one of said group of digital annotation signals includes a predetermined maximum number of annotation data blocks.

22. The telephone apparatus of claim 21 wherein at least one of said group of digital annotation signals includes all annotation data blocks generated within a predetermined time interval.

23. A telephone apparatus comprising
means for receiving digital audio signals interleaved with digital image and digital graphical annotation signals over an analog line connected to said apparatus and
means for decoding said received digital audio, digital image, and digital annotation signals into, respectively, audio, image, and annotation signals for output from said apparatus, and
wherein said digital audio signals are received during a first time interval and wherein
said digital image and digital annotation signals are received during a second time interval following said first time interval.

24. The telephone apparatus of claim 23 wherein each digital image signal and digital annotation signal includes an identifier which identifies it as a digital image or digital annotation signal.

25. The telephone apparatus of claim 23 including
means for transmitting over said analog line an acknowledgment signal in response to a received control signal.

26. The telephone apparatus of claim 25 wherein
said transmitted acknowledgment signal is in response to a received request to send an image control signal, and wherein said apparatus further includes
means for processing digital image signals received in response to said transmitted positive acknowledgment signal.

27. The telephone apparatus of claim 25 wherein said transmitted acknowledgment signal is in response to a received request to send an annotation control signal, and wherein said apparatus further includes
means for processing digital annotation signals received in response to said transmitted positive acknowledgment signal.

28. The telephone apparatus of claim 25 wherein said transmitted acknowledgment signal is in response to a received request to erase an annotation control signal, and wherein said apparatus further includes
means for processing an erase annotation signal received in response to said transmitted positive acknowledgment signal.

29. The telephone apparatus of claim 25 wherein said transmitted acknowledgment signal is in response to a received flash control signal, and wherein said apparatus further includes
means for returning said apparatus to an analog voice mode in response to said received flash control signal.

30. The telephone apparatus of claim 23 further comprising
means for monitoring the analog line and for providing an automatic answer capability at said telephone apparatus.

31. The telephone apparatus of claim 30 further comprising
means for automatically terminating the analog line connection to a remote telephone apparatus upon a detection of an on-hook condition at the remote telephone apparatus.

32. A telephone apparatus comprising
means for acquiring an image signal, an audio signal and a graphical annotation signal,
means for encoding each of said acquired audio, image and annotation signals as separate digital signals for simultaneous transmission over an analog line of a switched telephone network, and
wherein said digital signals are transmitted in an order which ensures synchronization, within a predetermined tolerance, of said audio and annotation signals.

33. A telephone apparatus comprising
means for acquiring an image signal, an audio signal and a graphical annotation signal,
means for encoding each of said acquired audio, image and annotation signals as separate digital signals for simultaneous transmission over an analog line of a switched telephone network, and
wherein each type of image and annotation signal is identified in a logical channel field identifier of a header of a digital data message.

34. A telephone apparatus comprising
means for acquiring an image signal, an audio signal and a graphical annotation signal,
means for encoding each of said acquired audio, image and annotation signals as separate digital signals for simultaneous transmission over an analog line of a switched telephone network,
means, responsive to user inputs, for establishing an analog voice mode connection over said analog line and wherein no digital image and digital annotation signals are communicated over said analog line and
means, responsive to the operation of a send button, for establishing a digital mode connection over said analog line for communicating said digital image and digital annotation signals at a periodic rate.

35. The apparatus of claim 34 further including
means, responsive to a loss of digital connection signal during said digital mode, for changing the operating mode of said apparatus from said digital mode to said analog mode.

36. The apparatus of claim 35 wherein said encoding means includes means for establishing an analog voice mode connection over said analog line when said apparatus goes off-hook, means, responsive to a send image signal, for establishing a digital mode connection over said analog line, and means, responsive to an established digital mode connection, for sequentially sending digital audio signals followed by at least one digital control signal, followed by a plurality of interspersed digital audio and digital image signals, followed by a plurality of interspersed digital audio and digital annotation signals, said digital audio and digital annotation signals being interspersed so as to maintain substantial synchronization when said digital annotation and digital audio signals are decoded and subsequently displayed and outputted, respectfully, at said remote apparatus.

37. A method of operating a telephone apparatus comprising the steps of receiving digital audio signals interleaved with digital image signals and digital annotation signals over an analog line connected to said apparatus, said digital audio signals being received during a first time interval and said digital image signals and digital annotation signals being received during a second time interval following said first time interval, and decoding said received digital audio, digital image, and digital annotation signals into, respectively, separate digital audio, digital image, and digital annotation signals for output from said apparatus simultaneously, said telephone apparatus thereby providing simultaneous audio, image and annotation capabilities.

38. A method of operating a telephone apparatus comprising the steps of acquiring an audio signal, image signal and graphical annotation signal, encoding said acquired audio signal into a group of digital audio signals for periodic transmission at a first rate over an analog line connected to said apparatus, encoding said acquired image signal, as a group of digital image signals, and encoding said acquired annotation signal, as a group of digital annotation signals, encoding each of said digital audio, distal image and digital annotation signals identified as a separate logical channel field in a digital data message for simultaneous transmission over an analog line of a switched telephone network, and transmitting said digital data message at said first rate over said analog line.

* * * * *